United States Patent
Senoo (10) Patent No.: US 10,224,766 B2
(45) Date of Patent: Mar. 5, 2019

(54) STATOR WITH CORE INCLUDING DIVIDED CORES, AND ELECTRIC MOTOR

(71) Applicant: FANUC CORPORATION, Yamanashi (JP)

(72) Inventor: Tatsuya Senoo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 22 days.

(21) Appl. No.: 14/729,169

(22) Filed: Jun. 3, 2015

(65) Prior Publication Data

US 2015/0364954 A1    Dec. 17, 2015

(30) Foreign Application Priority Data

Jun. 12, 2014    (JP) .................................. 2014-121817

(51) Int. Cl.
| | |
|---|---|
| *H02K 1/14* | (2006.01) |
| *H02K 1/08* | (2006.01) |
| *H02K 3/18* | (2006.01) |

(52) U.S. Cl.
CPC ............... *H02K 1/148* (2013.01); *H02K 1/08* (2013.01); *H02K 1/14* (2013.01); *H02K 1/141* (2013.01); *H02K 3/18* (2013.01)

(58) Field of Classification Search
CPC .......... H02K 1/141; H02K 1/148; H02K 1/14; H02K 1/00; H02K 1/08; H02K 3/18; Y10T 29/49009

(Continued)

(56) References Cited

U.S. PATENT DOCUMENTS

| | | | | |
|---|---|---|---|---|
| 1,314,128 | A | * | 8/1919 | Croll ...................... H02K 1/141 310/216.031 |
| 3,802,066 | A | * | 4/1974 | Barrett ...................... H02K 1/16 29/596 |

(Continued)

FOREIGN PATENT DOCUMENTS

| | | |
|---|---|---|
| JP | 8275414 A | 10/1996 |
| JP | 2000139048 A | 5/2000 |

(Continued)

OTHER PUBLICATIONS

English Abstract and Machine Translation for Japanese Publication No. 2001-238376 published Aug. 31, 2001, 12 pgs.

(Continued)

*Primary Examiner* — Bernard Rojas
*Assistant Examiner* — Alexander Singh
(74) *Attorney, Agent, or Firm* — Fredrikson & Byron, P.A.

(57) ABSTRACT

Provided is a stator that can easily attach a coil to a tooth and that can reduce concentration of stress generated in the core during operation. The stator includes a plurality of divided cores aligned in a circumferential direction. Each divided core includes a tooth, and a divided back yoke extending from an end on a radially outside of the tooth to a first circumferential side. A radial width of the divided back yoke is smaller than or equal to a circumferential width of the tooth. A connecting surface is arranged at an end on a second circumferential side of the divided yoke, the connecting surface being a plane or a convex surface extending from a side surface on the second circumferential side of the tooth to an outer circumferential surface of the divided back yoke.

6 Claims, 9 Drawing Sheets

(58) Field of Classification Search
USPC .... 310/216.009, 216.008, 216.109, 216.035, 310/216.015, 216.055, 216.086
See application file for complete search history.

(56) References Cited

U.S. PATENT DOCUMENTS

| | | | |
|---|---|---|---|
| 2010/0117478 A1* | 5/2010 | Sun | H02K 1/141 |
| | | | 310/158 |
| 2012/0112594 A1 | 5/2012 | Sano et al. | |
| 2013/0069479 A1 | 3/2013 | Li et al. | |

FOREIGN PATENT DOCUMENTS

| | | |
|---|---|---|
| JP | 2001128395 A | 5/2001 |
| JP | 2001218429 A | 8/2001 |
| JP | 2001238376 A | 8/2001 |
| JP | 2003134701 | 5/2003 |
| JP | 2004194404 | 7/2004 |
| JP | 2010115108 | 5/2010 |
| JP | 201370607 | 4/2013 |

OTHER PUBLICATIONS

English Abstract and Machine Translation for Japanese Publication No. 2001-218429 published Aug. 10, 2001, 12 pgs.
English Abstract and Machine Translation for Japanese Publication No. 2003-134701 published May 9, 2003, 12 pgs.
English Abstract and Machine Translation for Japanese Publication No. 2013-070607 A, published Apr. 18, 2013, 7 pgs.
English Abstract and Machine Translation for Japanese Publication No. 2010-115108 A, published May 20, 2010, 7 pgs.
English Abstract and Machine Translation for Japanese Publication No. 2004-194404 A, published Jul. 8, 2004, 12 pgs.
English Abstract and Machine Translation for Japanese Publication No. 2001-128395 A, published May 11, 2001, 21 pgs.
English Abstract and Machine Translation for Japanese Publication No. 2000-139048 A, published May 16, 2000, 17 pgs.
English Abstract and Machine Translation for Japanese Publication No. 08-275414 A, published Oct. 18, 1996, 8 pgs.

* cited by examiner

STATOR WITH CORE INCLUDING DIVIDED CORES, AND ELECTRIC MOTOR

BACKGROUND OF THE INVENTION

1. Technical Field

The invention relates to a stator with a core including divided cores, and an electric motor.

2. Description of the Related Art

A stator with a core including a plurality of divided cores divided in a circumferential direction is known (e.g., Japanese Laid-Open Patent Publication No. 2001-218429, Japanese Laid-Open Patent Publication No. 2001-238376, and Japanese Laid-Open Patent Publication No. 2003-134701).

As examples of a method of attaching a coil to the core of the stator, a method of directly winding a coil around a tooth provided in the core, and a method of producing an annular coil unit in advance and fitting the coil unit to a tooth are known. The latter method is desirable in terms of manufacturing efficiency. In this case, a stator, which enables the coil unit to be easily attached to the tooth and which has a structure where a stress concentration that occurs in the core during the operation of the stator can be reduced, is desired.

SUMMARY OF INVENTION

According to one aspect of the invention, a stator of an electric motor comprises a core including an annular back yoke, and a plurality of teeth aligned in a circumferential direction and extending toward radially inside from the back yoke; and a plurality of coils wound around each of the plurality of teeth. The core includes a plurality of divided cores aligned in the circumferential direction.

Each of the plurality of divided cores includes the tooth, and a divided back yoke extending from a radially outer end of the tooth toward a first circumferential side and constituting a part of the back yoke. A radial width of the divided back yoke is smaller than or equal to a circumferential width of the tooth. A connecting surface is provided at an end in a second circumferential side of the divided yoke, wherein the second circumferential side is opposite to the first circumferential side. The connecting surface is a plane or a convex surface extending from a side surface of the second circumferential side of the tooth to an outer circumferential surface of the divided back yoke.

The connecting surface may be a convex curved surface. A portion having a shape corresponding to the connecting surface may be provided at an end in the first circumferential side of the divided back yoke. The connecting surface may do not include a portion positioned at the second circumferential side of the side surface of the tooth, and a portion positioned at radially outside of the outer circumferential surface of the divided back yoke.

The connecting surface may be formed with a recess recessed inward from the connecting surface. A projection capable of being fitted to the recess may be formed at the end in the first circumferential side of the divided back yoke. According to another aspect of the invention, an electric motor comprises the stator described above.

BRIEF DESCRIPTION OF DRAWINGS

In addition to the above-described object of the invention other objects, characteristics, and advantages will become apparent by describing the following preferred embodiments with reference to the accompanying drawings, wherein.

DETAILED DESCRIPTION

Hereinafter, the invention will be described in more detail based on the drawings. First, referring to FIG. 1, a stator 10 according to an embodiment of the invention will be described. Note that, in the following description, the axial direction indicates a direction along a center axis O of the stator 10. Further, the radial direction indicates a direction of a radius of a circle centered about the center axis O. Further, a circumferential direction indicates a circumferential direction of a circle centered about the center axis O.

Figure 1:
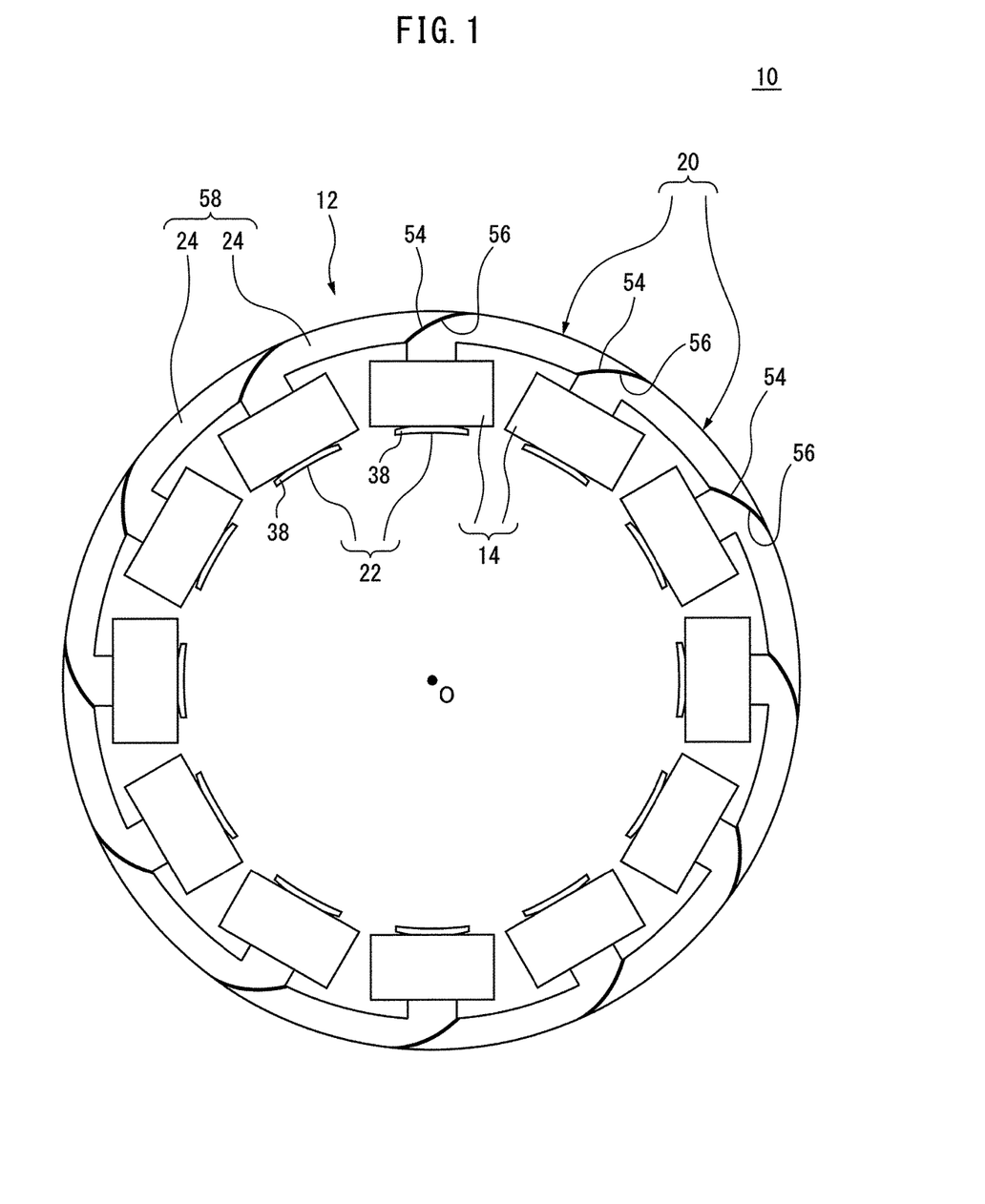
FIG. 1 is an outer appearance view of a stator according to an embodiment of the invention seen from an axial direction.

The stator 10 constitutes an electric motor (not shown) together with a rotator (not shown) rotatably arranged at radially inside of the stator 10. The stator 10 includes a core 12 and a plurality of coils 14. The core 12 includes a plurality of divided cores 20 aligned in the circumferential direction. In the present embodiment, the core 12 includes a total of twelve divided cores 20.

Figure 2:
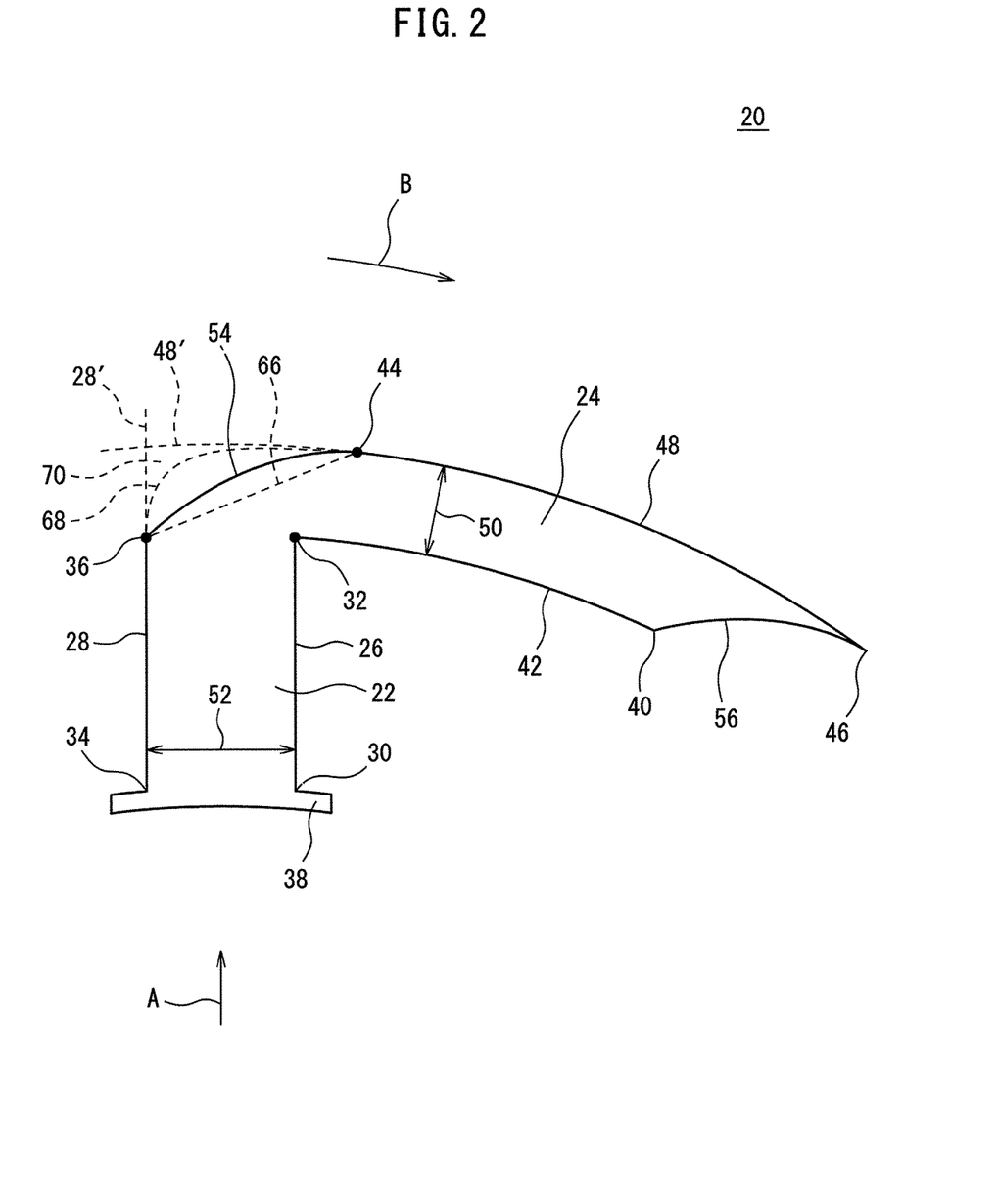
FIG. 2 is an enlarged view of the divided core shown in FIG. 1.

Next, referring to FIG. 2, the divided core 20 will be described. Note that, a direction indicated by the arrow A in FIG. 2 indicates a direction toward radially outside (outside in the radial direction), while a direction indicated by the arrow B indicates a direction toward the first circumferential side (direction). The divided core 20 includes a tooth 22 extending in the radial direction, and a divided back yoke 24 extending from a radially outer end of the teeth 22 toward the first circumferential side.

The tooth 22 has a side surface 26 of the first circumferential side, and a side surface 28 of the second circumferential side opposite to the first circumferential side. The side surface 26 is a plane extending in the radial direction from a radially inner edge 30 to a radially outer edge 32. Similarly, the side surface 28 is a plane extending in the radial direction from a radially inner edge 34 to a radially outer edge 36. A wedge 38 projecting out from the tooth 22 toward both sides in the circumferential direction is formed at a radially inner end of the tooth 22.

The divided back yoke 24 is an arcuate member having an inner circumferential surface 42 and an outer circumferential surface 48. The inner circumferential surface 42 is an arcuate surface extending in the circumferential direction from the edge 32 to an edge 40 of the first circumferential side. On the other hand, the outer circumferential surface 48 is an arcuate surface extending in the circumferential direction from an edge 44 of the second circumferential side to an edge 46 of the first circumferential side.

In the present embodiment, a radial width 50 (corresponding to shortest distance between inner circumferential surface 42 and outer circumferential surface 48) of the divided back yoke 24 is set to be smaller than or equal to a circumferential width 52 (corresponding to shortest distance between the side surfaces 26 and 28) of the tooth 22.

A connecting surface 54, which extends from the side surface 28 of the tooth 22 to the outer circumferential surface 48 of the divided back yoke 24, is formed at the end in the second circumferential side of the divided back yoke 24. More specifically, the connecting surface 54 is a convex curved surface extending from the radially outer edge 36 of the side surface 28 to the edge 44 of the second circumferential side of the outer circumferential surface 48 in a curved manner so as to bulge out toward a side opposite to the edge 32. The connecting surface 54 may be an arcuate surface having a predefined curvature radius, or may be configured by a curved surface in which a plurality of curved surfaces having different curvature radii from each other are continuously connected.

On the other hand, a concave curved surface 56 having a shape which corresponds to the connecting surface 54 is formed at the end in the first circumferential side of the divided back yoke 24. The concave curved surface 56 has a shape complementary to the connecting surface 54, and extends from the edge 40 to the edge 46 in a curved manner so as to be recessed toward the inside of the divided back yoke 24.

Referring to FIG. 1 again, a total of twelve divided cores 20 are aligned in the circumferential direction so as to constitute the core 12. In this state, the connecting surface 54 of one divided core 20 contacts the concave curved surface 56 of the other divided core 20 which adjoins the one divided core 20 in the second circumferential side.

The two divided cores 20 adjacent to each other in the circumferential direction are welded between the connecting surface 54 and the concave curved surface 56 so as to be fixed to each other. As shown in FIG. 1, the divided cores 20 are fixed to each other so as to continuously align in the circumferential direction, whereby an annular back yoke 58 of the core 12 is formed by the annularly aligning divided back yokes 24. Further, the tooth 22 arranged in each of the divided cores 20 extends toward radially inside from the back yoke 58 of the core 12, whereby a plurality of teeth 22 are arranged so as to align in the circumferential direction at substantially equal intervals.

Figure 3:
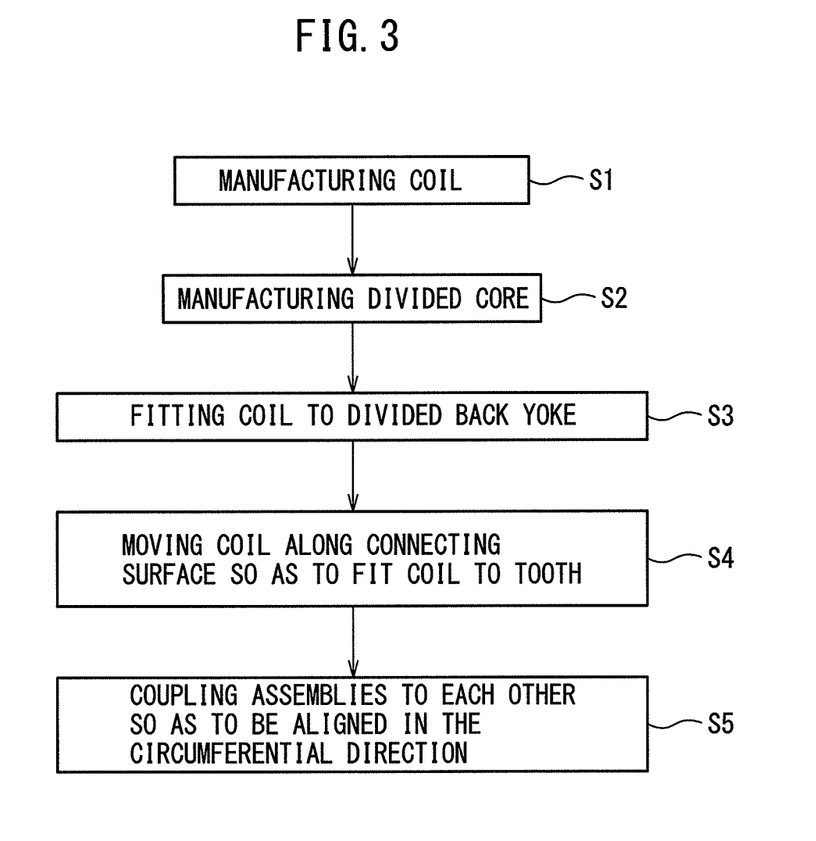
FIG. 3 is a flowchart illustrating a method of manufacturing the stator, according to an embodiment of the invention.
Figure 4:
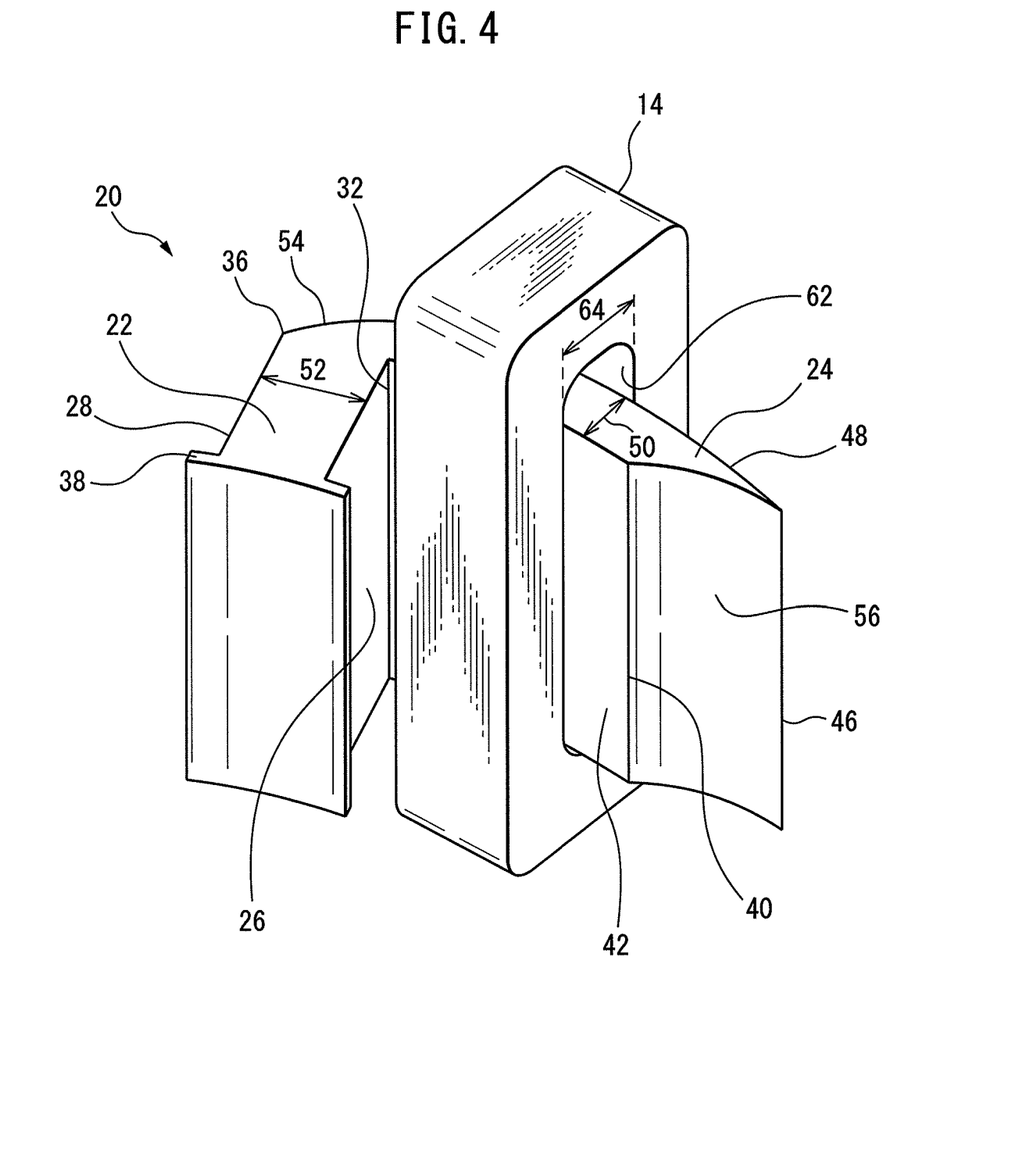
FIG. 4 is a perspective view illustrating a state where the divided back yoke of the divided core is inserted into the coil.
Figure 5:
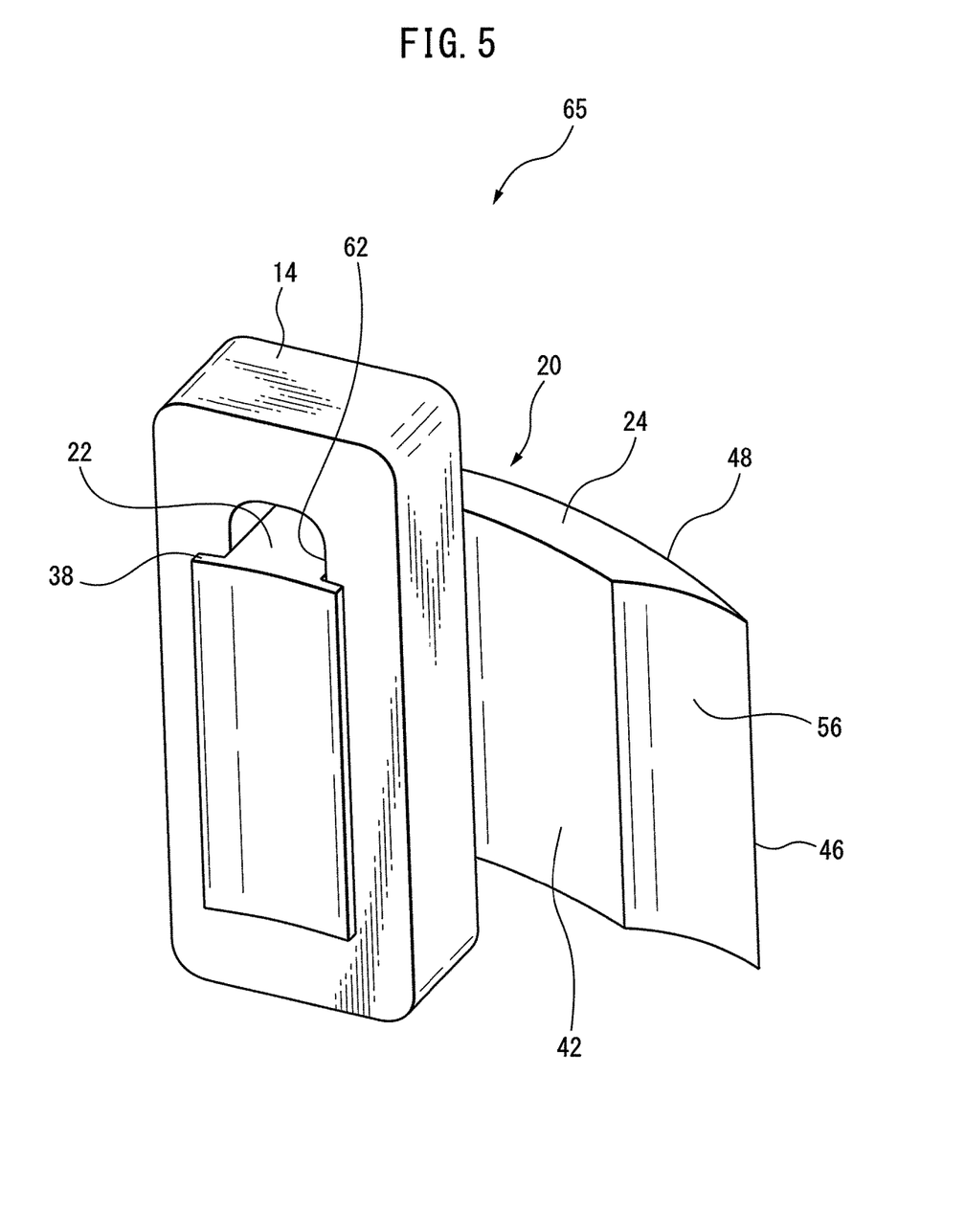
FIG. 5 is a perspective view illustrating a state where the coil is fitted to the tooth of the divided core.

Next, referring to FIGS. 3 to 5, a method of manufacturing the stator 10 will be described. At step S1, a user manufactures the coil 14 in the form of one coil unit in advance. For example, the user winds a conductive wire into an annular shape by an automatic coil winding machine etc. so as to automatically manufacture the coil 14 in the form of an annular coil unit.

Thus manufactured coil 14 has a center hole 62 having a width 64. The width 64 is set to be greater than the width 50 of the divided back yoke 24 and smaller than the circumferential width of the wedge 38.

At step S2, the user manufactures the divided cores 20 described above. For example, the user manufactures the divided cores 20 by press work, etc. At step S3, the user fits the coil 14 to the divided back yoke 24. Specifically, the user inserts the divided back yoke 24 into the center hole 62 of the coil 14, as a result of which the coil 14 is fitted to the divided back yoke 24, as shown in FIG. 4.

At step S4, the user moves the coil 14 along the connecting surface 54 so as to fit the coil 14 to the tooth 22. Specifically, the user moves the coil 14 toward the tooth 22 from the position shown in FIG. 4 so as to turn the coil 14 in a counterclockwise direction when seen from the upper side of FIG. 4.

As described above, the connecting surface 54 is configured by a convex curved surface. According to this configuration, the user can smoothly turn the coil 14 in the counterclockwise direction, whereby can smoothly move the coil 14 along the connecting surface 54 so as to fit the coil 14 to the tooth 22. As a result, an assembly 65 of the divided core 20 and the coil 14 shown in FIG. 5 is manufactured.

Further, as described above, the width 50 of the divided back yoke 24 is set to be smaller than or equal to the width 52 of the tooth 22, and the width 64 of the center hole 62 of the coil 14 is set to be greater than the width 50 of the divided back yoke 24 and smaller than the circumferential width of the wedge 38.

In this case, when the width 64 of the center hole 62 of the coil 14 is set to be smaller than the width 52 of the tooth 22, the diameter of the center hole 62 of the coil 16 gradually enlarges as the user moves the coil 14 along the connecting surface 54, and the coil 14 is fitted to the tooth 22 consequently. According to this configuration, the user can smoothly and easily fit the coil 14 to the tooth 22 having a width greater than the center hole 62.

At step S5, the user couples the assemblies 65 manufactured at step S4 to each other so as to be aligned in the circumferential direction. As an example, the user couples the plurality of divided cores 20 to each other by contacting and welding the concave curved surface 56 of one divided core 20 and the connecting surface 54 of the other divided core 20. As a result, the stator 10 shown in FIG. 1 is manufactured.

As another example, the user may fix the plurality of divided cores 20 to each other by aligning the plurality of divided cores 20 in the circumferential direction as illustrates in FIG. 1, and press-fitting a fixation ring (not shown) so as to surround the outer circumferential surfaces 48 of the divided cores 20 from the radially outside.

According to the present embodiment, it is possible to manufacture the coil 14 in the form of a coil unit in advance, and smoothly fit it to the tooth 22 from the divided back yoke 24 of the divided core 20. Due to this, it is possible to automatize the manufacture of the coil 14 and easily install the coil 14 to the tooth 22, whereby the manufacturing efficiency of the stator 10 can be improved.

In addition, according to the present embodiment, the connecting surface 54 is configured by a convex curved surface smoothly and continuously extending from the edge 36 of the side surface 28 to the edge 44 of the outer circumferential surface 48. Due to this configuration, it is possible to prevent stress concentration from occurring at the connecting surface 54, whereby the strength of the core 12 during the operation of the stator 10 can be enhanced.

In addition, according to the present embodiment, the concave curved surface 56 having a shape corresponding to the connecting surface 54 is provided at the end in the first circumferential side of the divided back yoke 24. Due to this configuration, the connecting surface 54 of one divided core 20 and the concave curved surface 56 of the other divided core 20 adjoining to the one divided core 20 from the second circumferential side can be tightly fitted and coupled to each other, when assembling the stator 10. Therefore, it is possible to enhance the strength of the core 12 during the operation thereof.

Note that, various forms of connecting surfaces can be applied to the divided core 20, instead of the above connecting surface 54. Such embodiment will be described with reference to FIG. 2. For example, the divided core 20 may have a connecting surface 66 which is a plane extending from the edge 36 of the side surface 28 to the edge 44 of the outer circumferential surface 48. Alternatively, the divided core 20 may include a connecting surface 68 which is a convex curved surface extending in a curved manner so as to bulge out more outwardly than the above connecting surface 54.

The connecting surfaces 54, 66, and 68 may be configured so as not to include a portion positioned at the second circumferential side of the side surface 28 of the tooth 22, and a portion positioned at the radially outside of the outer circumferential surface 48 of the divided back yoke 24, in order to facilitate the work for fitting the coil 14 to the tooth 22 at step S4.

In other words, the connecting surfaces 54, 66, and 68 are configured to extend within a region 70 surrounded by a virtual plane extending from the edge 36 to the edge 44 (i.e., connecting surface 66), a virtual extended surface 28' defined by the side surface 28 being extended to radially outside, and a virtual extended surface 48' defined by the outer circumferential surface 48 being extended to the second circumferential side at the same curvature.

Figure 6:
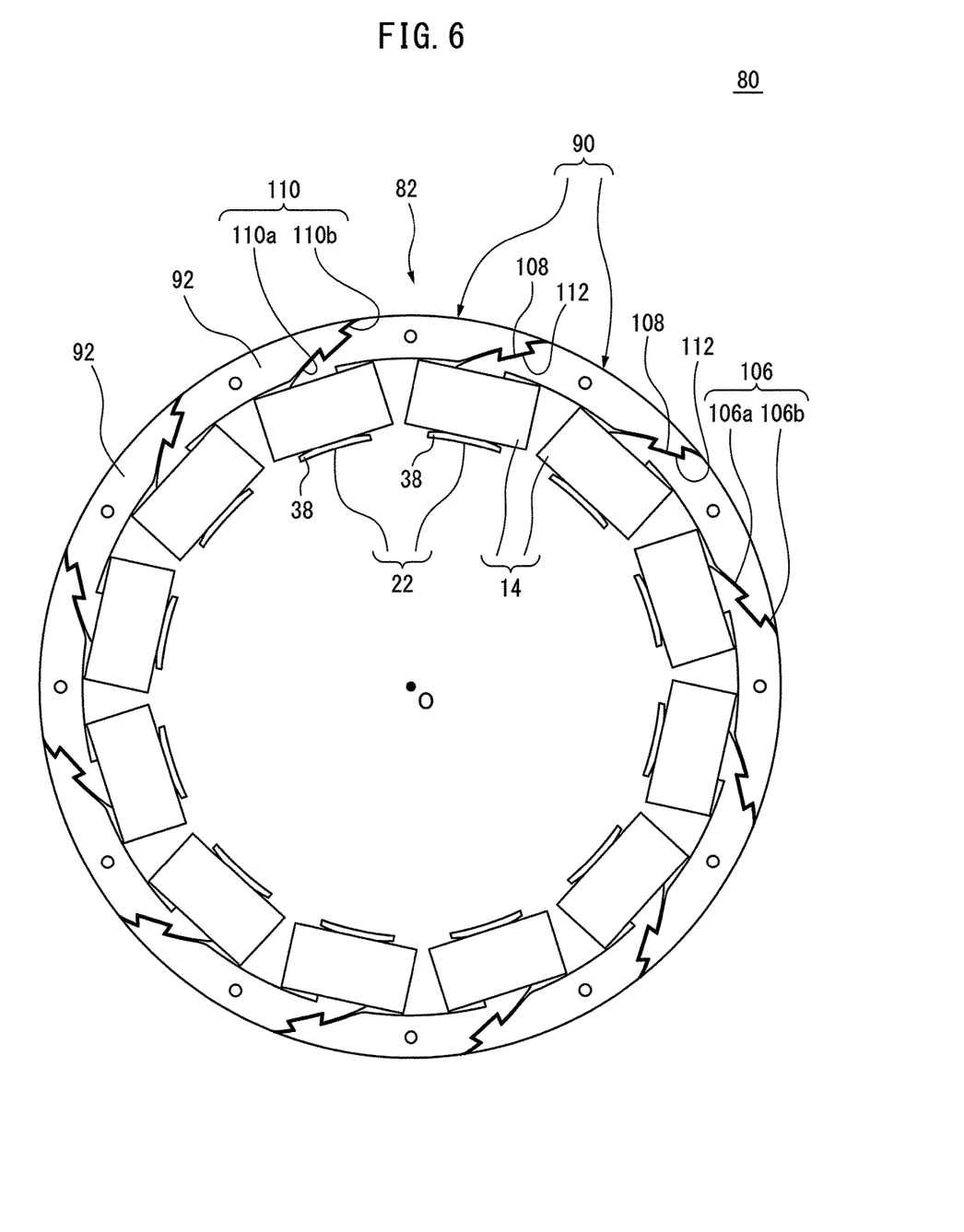
FIG. 6 is an outer appearance view of a stator according to another embodiment of the invention seen from the axial direction.

Next, referring to FIG. 6A, a stator 80 according to another embodiment of the invention will be described. Note that, the same reference numerals will be assigned to elements similar to the above-mentioned embodiments, and the detailed description thereof will be omitted. The stator 80 includes a core 82 and the plurality of coils 14. The core 82 includes a total of twelve divided cores 90 aligned in the circumferential direction.

Figure 7:
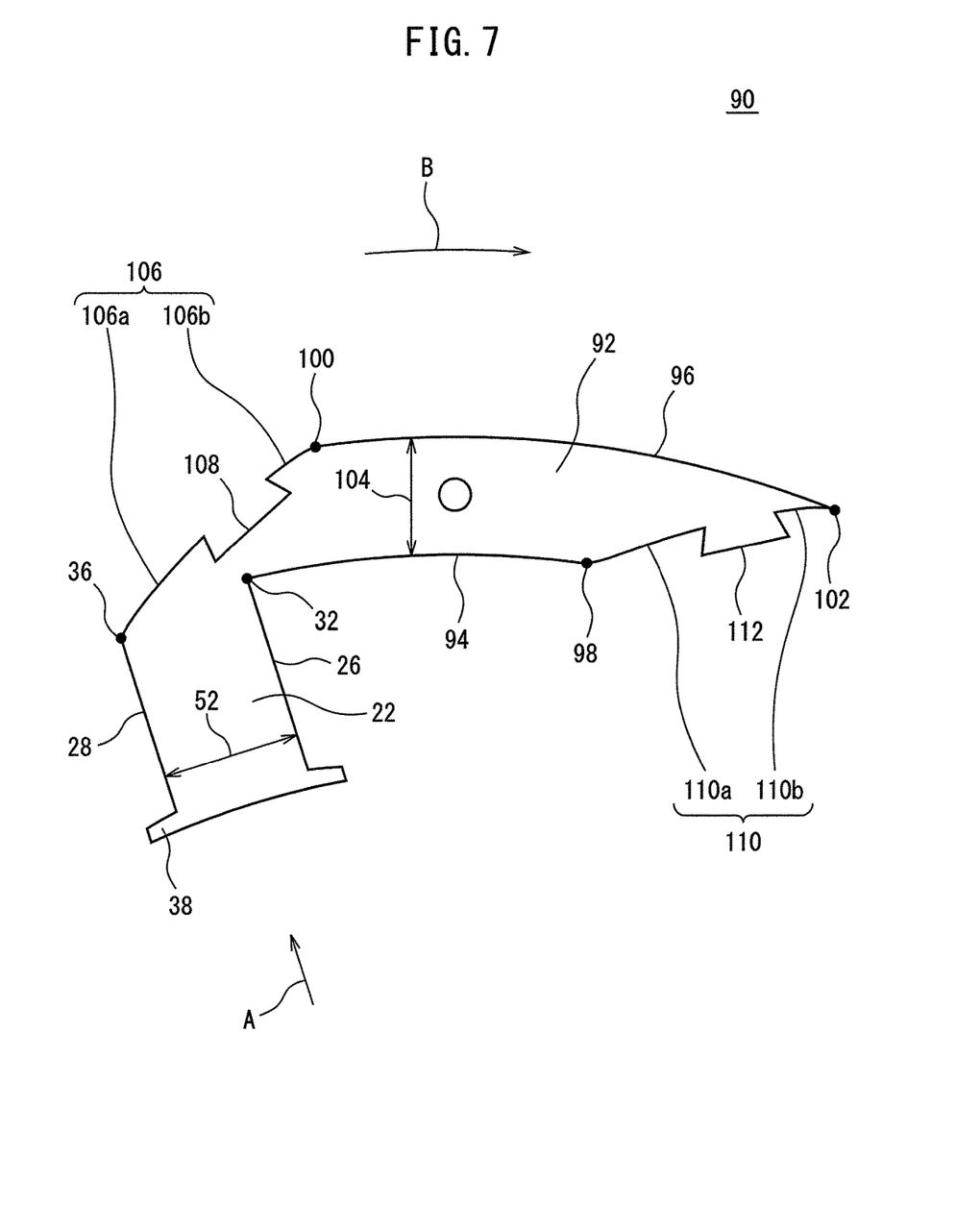
FIG. 7 is an enlarged view of the divided core shown in FIG. 6.
Figure 8:
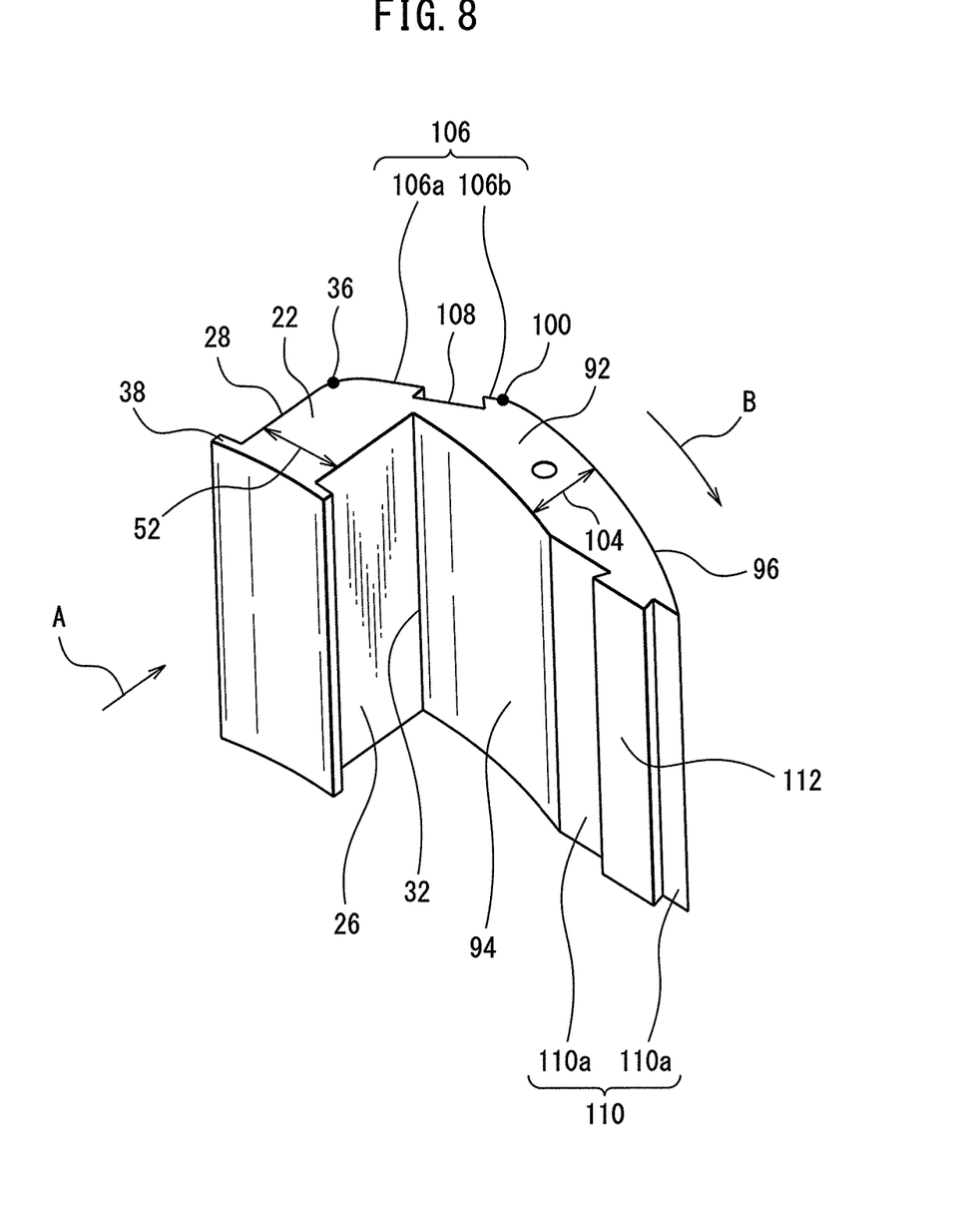
FIG. 8 is a perspective view of the divided core shown in FIG. 7.

Next, referring to FIGS. 7 and 8, the divided core 90 will be described. Note that, a direction indicated by the arrow A in FIGS. 7 and 8 indicates a direction toward radially outside, while a direction indicated by the arrow B indicates a direction toward the first circumferential side (direction). The divided core 90 includes the tooth 22, and a divided back yoke 92 extending from a radially outer end of the tooth 22 toward the first circumferential side.

The divided back yoke 92 is an arcuate member having an inner circumferential surface 94 and an outer circumferential surface 96. The inner circumferential surface 94 is an arcuate surface extending in the circumferential direction from the edge 32 to an edge 98 in the first circumferential side. The outer circumferential surface 96 is an arcuate surface extending in the circumferential direction from an edge 100 in the second circumferential side to an edge 102 in the first circumferential side. Similar to the above-mentioned embodiment, a radial width 104 of the divided back yoke 92 is set to be smaller than or equal to the circumferential width 52 of the tooth 22.

A connecting surface 106, which extends from the edge 36 of the side surface 28 of the tooth 22 to the edge 100 of the outer circumferential surface 96 of the divided back yoke 92, is formed at the end in the second circumferential side of the divided back yoke 92. The connecting surface 106 is a convex curved surface extending in a curved manner to bulge out to the side opposite to the edge 32.

In the present embodiment, the connecting surface 106 is formed with a recess 108 recessed inward from the connecting surface 106. The recess 108 is formed to extend through the divided core 90 in the axial direction. Due to the recess 108, the connecting surface 106 is divided into a first connecting surface 106a and a second connecting surface 106b.

On the other hand, a concave curved surface 110 having a shape corresponding to the connecting surface 106 is provided at the end in the first circumferential side of the divided back yoke 92. The concave curved surface 110 has a shape complementary to the connecting surface 106, and extends in a curved manner so as to be recessed toward the inside of the divided back yoke 92.

The concave curved surface 110 is formed with a projection 112 projecting out from the concave curved surface 110. The projection 112 has a shape capable of being fitted into the recess 108. Due to the projection 112, the concave curved surface 110 is divided into a first concave curved surface 110a and a second concave curved surface 110b. More specifically, the first concave curved surface 110a has a shape complementary to the first connecting surface 106a, while the second concave curved surface 110b has a shape complementary to the second connecting surface 106b.

Referencing FIG. 6 again, the divided cores 90 are aligned in the circumferential direction so as to constitute the core 82. In this state, the projection 112 of one divided core 90 is fitted into the recess 108 of the other divided core 90 which adjoins the one divided core 90 from the first circumferential side.

Further, the first connecting surface 106a and the second connecting surface 106b of one divided core 90 respectively contact the first concave curved surface 110a and the second concave curved surface 110b of the other divided core 90 adjacent on the second circumferential side. Thus, in the present embodiment, the divided cores 90 adjacent to each other in the circumferential direction are coupled to each other by the engagement between the projection 112 and the recess 108.

Next, referring to FIG. 3 and FIGS. 6 to 9, a method of manufacturing the stator 80 will be described. Note that, Step S1 to step S4 are similar to those in the method of manufacturing the stator 10 described above, and therefore the detailed description thereof will be omitted. At step S5, the user couples the assemblies 114 (FIG. 9), each of which includes the divided core 90 and the coil 14, and which was assembled at step S4, to each other so as to align in the circumferential direction.

Figure 9:
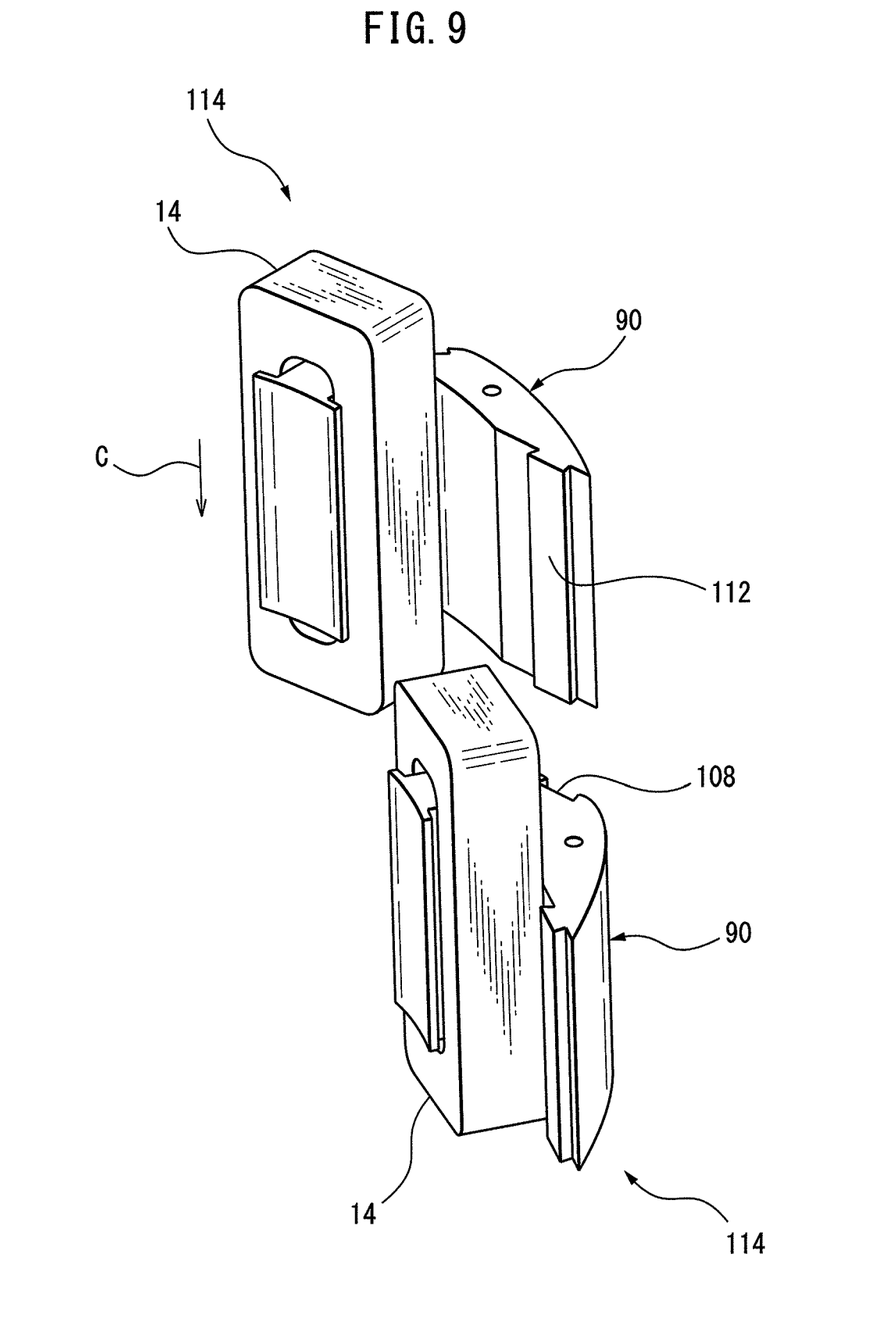
FIG. 9 is a view for explaining a method of assembling the stator shown in FIG. 6.

Specifically, as shown in FIG. 9, the user positions the projection 112 of the divided core 90 of one assembly 114 relative to the recess 108 of the divided core 90 of the other assembly body 114, and moves the one assembly body 114 toward the other assembly body 114 as indicated by the arrow C so as to press-fit the projection 112 into the recess 108.

Whereby, the projection 112 and the recess 108 engage each other so that the assembly bodies 114 are coupled to each other. Thus, the plurality of assemblies 114 are coupled to each other so as to continuously align in the circumferential direction, whereby the stator 80 shown in FIG. 6 is manufactured. According to the present embodiment, the assemblies 114 can be coupled to each other by simply press-fitting the projection 112 into the recess 108. Therefore, it is possible to make the assembly work easier and also enhance the coupling strength of the core 82.

In the above embodiment, a case where the connecting surface is configured by the concave curved surface or the plane has been described. However, the invention is not limited to this. The connecting surface may be configured by a convex surface which has a polygonal shape constituted by a plurality of planes connected to each other, or which has a polygonal shape constituted by a plurality of planes connected to each other wherein the corners of such polygonal convex surface is rounded, etc.

The invention has been described through the embodiments of the invention, but the above-described embodiments preferably do not limit the invention related to the Claims. Furthermore, the technical scope of the invention may also include a mode of combining the characteristics described in the embodiments of the invention. However, all the combinations of the characteristics may not be essential in the means for solving the problem of the invention. Furthermore, those skilled in the art may recognize that the above-described embodiments may be variously modified or improved.

Furthermore, the executing order of each process of the operation, procedure, step, process flow, stage, and the like in the device, system, program, and method described in the Claims, specification, and drawings may not be clearly described as "before", "prior to", and the like in particular, and may be realized in an arbitrary order unless the output of the previous process is use in the subsequent process. With respect to the operation flow in the Claims, specification, and drawings, the description may be made using "first", "next", "then" and the like for the sake of convenience of explanation, but this may not mean that the operation flow is to be performed in such order.

What is claimed is:

1. A stator of an electric motor, comprising:
   a core including an annular back yoke, and a plurality of teeth aligned in a circumferential direction; and
   a plurality of annular coils wound around each of the plurality of teeth, each annular coil being fitted to the tooth in a condition where a center hole of the annular coil is enlarged by the tooth around which the annular coil is wound, wherein the core includes a plurality of divided cores aligned in the circumferential direction,
   the plurality of divided cores including a first divided core and a second divided core, the first divided core and the second divided core being adjacent to each other,
   each of the plurality of divided cores includes:
      the tooth extending radially inward, the tooth comprising a first side surface extending between a first radial inner edge and a first radial outer edge and a second side surface opposite to the first side surface extending between a second radial inner edge and a second radial outer edge,
      the tooth having a circumferential width defined between the first side surface and the second side surface; and
      a divided back yoke, comprising:
         an outer circumferential surface terminating in a first circumferential edge on a first circumferential side and a second circumferential edge on a second circumferential side, the first side surface of the tooth being on the first circumferential side, the second circumferential side being opposite to the first circumferential side, the second circumferential edge being disposed away from the first side surface of the tooth; and
      an inner circumferential surface terminating in a third circumferential edge on the first circumferential side and the first radial outer edge on the second circumferential side,
      an end surface defined between the first circumferential edge and the third circumferential edge,
      the divided yoke having a radial width defined between the outer circumferential surface and the inner circumferential surface, the radial width of the divided back yoke being smaller than or equal to the circumferential width of the tooth;
      a connecting surface extending between the second circumferential edge and the second radial outer edge, the connecting surface being a plane or a convex surface, the end surface being of a shape complementary to the connecting surface,
      the first circumferential edge of the first divided core contacting the second circumferential edge of the second divided core,
      the first circumferential edge of the first divided core being away from the first side surface of the tooth of the second divided core on the first circumferential side.

2. The stator according to claim 1, wherein the connecting surface is a convex curved surface.

3. The stator according to claim 1, wherein a portion having a shape corresponding to the connecting surface is provided at an end of the first circumferential side of the divided back yoke.

4. The stator according to claim 1, wherein the connecting surface does not include:
   a portion positioned at the second circumferential side of the side surface of the tooth; and
   a portion positioned at radially outside of the outer circumferential surface of the divided back yoke.

5. The stator according to claim 1, wherein the connecting surface is formed with a recess recessed inward from the connecting surface, wherein
   a projection capable of being fitted to the recess is formed at the end of the first circumferential side of the divided back yoke.

6. An electric motor comprising the stator of claim 1.

* * * * *